United States Patent [19]
Grab

[11] Patent Number: 4,759,666
[45] Date of Patent: Jul. 26, 1988

[54] DRILL GUIDES AND APPARATUS FOR HOLDING SAME

[76] Inventor: Joseph A. Grab, 12727 SW. 19th, Lake Oswego, Oreg. 97034

[21] Appl. No.: 929,752

[22] Filed: Nov. 12, 1986

[51] Int. Cl.[4] .............................................. B23B 47/28
[52] U.S. Cl. .............................. 408/115 B; 408/72 B; 408/84; 408/241 B
[58] Field of Search ............... 408/72 R, 72 B, 79–81, 408/84, 103, 109, 115 R, 115 B, 241 B, 241 R, 241 G, 711; 33/185 R, 189; 30/310; 81/441, 53.2; 29/426.4, 426.5

[56] References Cited

U.S. PATENT DOCUMENTS

| | | | |
|---|---|---|---|
| 2,165,485 | 7/1939 | Jackman | 29/426.4 X |
| 2,391,405 | 12/1945 | Fuglie | 408/80 X |
| 2,435,256 | 2/1948 | Whitmore | 408/115 R |
| 2,686,447 | 8/1954 | Vock et al. | 408/79 X |
| 2,936,657 | 5/1960 | Berlin et al. | 408/115 R X |
| 3,015,240 | 1/1962 | Hodnett | 408/84 |
| 3,026,748 | 3/1962 | Comorau | 408/115 R X |
| 3,083,593 | 4/1963 | Cotter | 408/115 R X |
| 3,097,891 | 7/1963 | Brideau | 408/72 B X |
| 3,146,675 | 9/1964 | Anderson | 408/115 R X |
| 3,148,562 | 9/1964 | Moss | 408/115 R X |
| 3,276,326 | 10/1966 | Gibbons et al. | 408/72 R X |
| 3,439,567 | 4/1969 | Denis | 81/53.2 |
| 3,508,321 | 4/1970 | Wood | 29/426.4 |

*Primary Examiner*—Gil Weidenfeld
*Assistant Examiner*—Steven C. Bishop
*Attorney, Agent, or Firm*—Chernoff, Vilhauer, McClung & Stenzel

[57] ABSTRACT

A drill guide apparatus for use in drilling a central bore in a portion of a broken-off bolt remaining in a threaded bore. A clamp tube carries inwardly-directed setscrews for attaching the clamp tube to a stud or bolt located near the broken bolt. An arm extends adjustably through the clamp tube, and setscrews in the clamp tube hold the arm in a desired position relative to the clamp tube. A drill guide holder mounted on the arm includes setscrews which hold an appropriate drill guide tube in position to receive and guide a drill to bore the required hole in the remaining portion of the broken bolt.

12 Claims, 1 Drawing Sheet

DRILL GUIDES AND APPARATUS FOR HOLDING SAME

BACKGROUND OF THE INVENTION

The present invention relates to devices for guiding drills, and particularly for guiding drills for boring centrally located holes in broken bolts so as to facilitate use of a bolt extractor to remove such broken bolts from threaded bores.

Because of corrosion, metal fatigue, and other related and cooperating factors, bolts often break leaving parts of them engaged in threaded bores. Often, the portion of such a broken bolt left exposed to be grasped is too little to be useful to remove the remaining part of the bolt from the threaded bore. It is often impractical in such situations to disassemble the structure or device in which the bolt is located to the extent necessary to permit precision machinery to be used conveniently to remove the broken bolt. Ordinarily, therefore, it is desirable at least to attempt to remove a broken bolt by the use of a bolt extractor, a wellknown tool having a tapered, fluted body twisted to provide steeply pitched multiple shallow threads of the opposite hand from that of the threads of the broken bolt. Such a tool is of strong, hardened metal, and its taper causes the steeply threaded portion to fit with increasing security within a hole bored centrally within the remaining portion of a broken bolt, so that the bolt extractor may be turned with an appropriate wrench to remove the remaining portion of the broken bolt from the threads of the bore in which it is engaged. The hole bored in a bolt to be removed in this manner must be located centrally in order to avoid damaging the threads of the hole in which the bolt is engaged, either while boring the hole or by use of the extractor, as damaging those threads would only add to the problems presented by the broken bolt itself.

Because the surface of the remaining portion of a twisted-off bolt is typically uneven, it is usually very difficult to start a hand-held drill into the remaining portion of a broken bolt to produce a centrally located hole extending coaxially with the remainder of the broken bolt.

While there are devices which might be useful to some extent for guiding a drill to produce such a hole in the remaining portion of a broken bolt, the previously available devices are undesirably complex and expensive, or else not well adapted for use in varied circumstances. For example, Moss U.S. Pat. No. 3,148,562 discloses a tool in which a pair of legs are hinged together and may be clamped to establish a required distance between opposite end portions of the device. A bolt may be placed through a bore in one end of the device into a threaded hole, while a drill guide is received in the other end of the device to establish the location and direction for a hole parallel to the bolt and at a desired distance. The Moss device, however, is apparently not useful except on workpieces having a flat surface between and perpendicular to parallel threaded holes. Cotter U.S. Pat. No. 3,083,593 discloses a drill guide apparatus for ensuring that holes are drilled perpendicularly into a workpiece at locations determined by a jig. Anderson U.S. Pat. No. 3,146,675 discloses a hole cutter in which an adjustably clamped center locator is movable along an arm of a drill guide holder. Comorau U.S. Pat. No. 3,026,748 discloses a drill guiding device including a complex jig arrangement. Whitmore U.S. Pat. No. 2,435,256 discloses an adjustable hole locating device which does not appear to be useful in drilling holes in broken-off studs in most locations because of its size. Berlin et al. U.S. Pat. No. 2,936,657 discloses a drill guide which depends on sharp edges engaging the surface surrounding the location where a hole is to be bored.

What is needed, then, is a simple device for guiding a drill to bore central holes coaxially into an end of a broken bolt, so that the bolt can be extracted without damaging the material surrounding it. Such a device should be of simple construction, inexpensive, and adaptable for use in a range of sizes.

SUMMARY OF THE INVENTION

The present invention provides a device which fills the need for a guide for use in drilling centrally located holes into broken-off bolts and the like without the shortcomings and disadvantages of the previously known devices. According to the present invention a device is provided which includes an adjustable clamp portion which may be attached to a projection such as a stud or bolt head. The clamp includes three setscrews arranged to attach the clamp to a bolt or stud located nearby the broken-off bolt. A drill guide holder includes setscrews arranged to hold a drill guide tube securely. An arm extends laterally from the drill guide holder and is attached to the clamp in a manner permitting the arm to be rotated and adjusted in effective length, and fasteners such as setscrews permit the arm to be secured in a desired position relative to the clamp. This combination of clamp, arm, and drill guide holder is used to support a selected drill guide tube in position aligned with the remainder of a broken-off bolt, to guide a drill to bore a central hole in the bolt, so that a bolt extractor can be used to remove the remainder of the bolt from its location in a threaded hole. Each drill guide tube includes a bore of the appropriate size to guide the proper drill accurately enough for boring the required hole in the broken-off bolt. In a preferred embodiment of the invention the outside of the drill guide tube is cylindrical and has a diameter barely less than the minimum interior diameter of a threaded hole of the size to receive the bolt, so that, should the bolt be broken off sufficiently below the surface of the structure defining the bolt hole, the drill guide tube may be inserted into the bolt hole above the remaining portion of the broken-off bolt to guide a drill so as to locate the required hole centrally within the remainder of the bolt.

It is therefore a principal object of the present invention to provide a guide for use in drilling holes for insertion of bolt extractors in the remaining portions of bolts which have been broken off in threaded holes.

It is another primary object of the present invention to provide a tool for guiding a drill for boring a hole in a bolt broken off flush with or below the surface of an object which is too large to be moved conveniently to a position where a drill press may be used.

It is an important feature of the present invention that it provides a set of guide tubes of different standard sizes, so that an appropriate one will fit within the threaded bore in which a remainder of a broken-off bolt may be located, with each guide tube including a bore of the appropriate size to guide the drill of the appropriate size for producing a hole in the remaining portion of the broken-off bolt, so that a bolt extractor may be used properly to remove the remaining portion of the broken-off bolt.

It is another important feature of the present invention that it provides a clamp attachable to a bolt or stud, and a guide tube holder adjustably supported attached to the clamp, for holding a guide tube in the proper location and orientation.

It is a further feature of the present invention that it holds a guide tube spaced axially apart from an end of a bolt broken off flush with or above a surrounding surface, providing clearance for chips and shavings as a hole is bored into the remaining portion of a broken-off bolt.

It is a principal advantage of the present invention that it provides a device which is easier to use than previously known hole drilling guides for the same purpose.

It is a further advantage of the present invention that it makes it possible to remove broken bolts faster than possible previously, by making it possible to drill holes into such broken-off bolts, so that extractors can be used in situations where they could not have been used previously.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
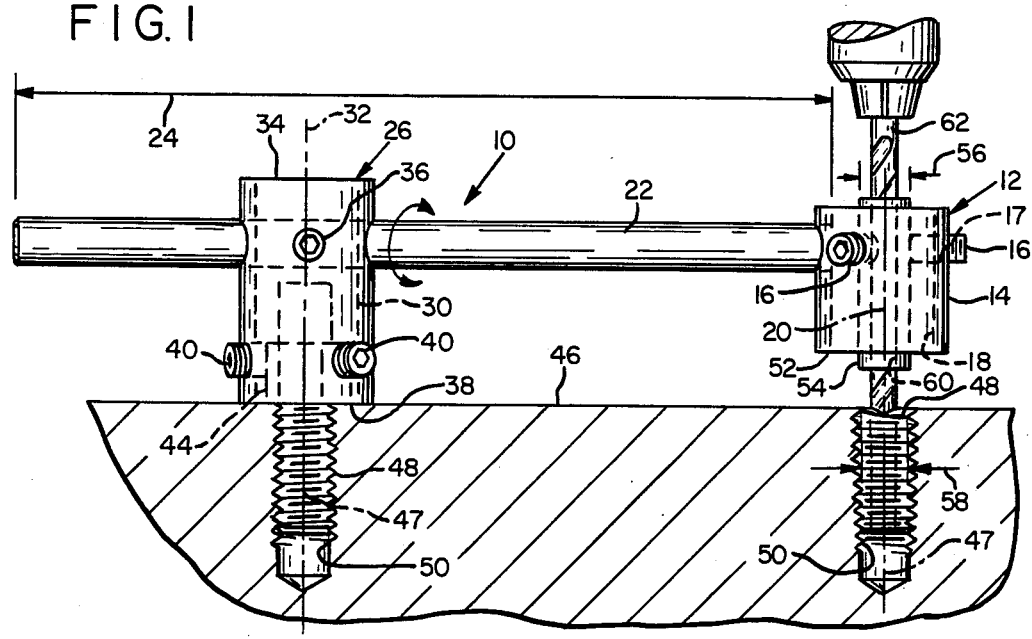
FIG. 1 is a side elevational view of a drilling guide assembly according to the present invention being used to guide a drill for boring a hole in a bolt broken off in a threaded bore.
Figure 2:
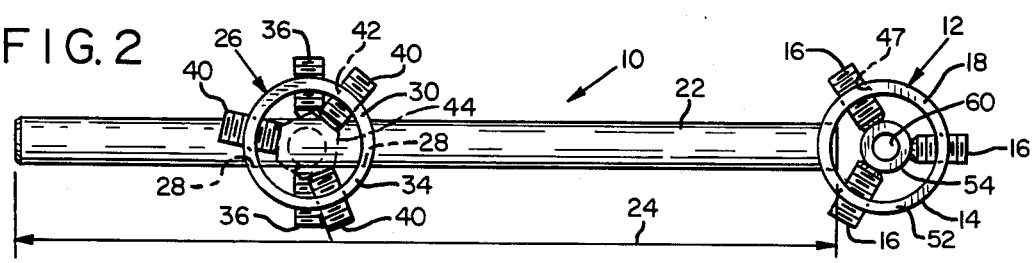
FIG. 2 is a bottom view of the drill guide holder shown in FIG. 1, with a drill guide tube held in place therein.
Figure 3:
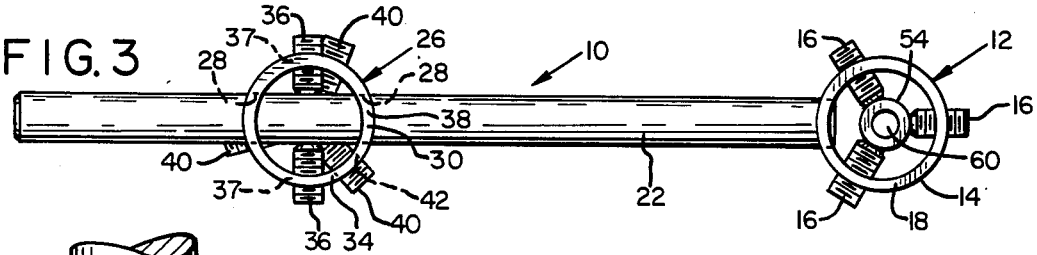
FIG. 3 is a top view of the drill guide holder and drill guide tube shown in FIGS. 1 and 2.

Referring now to the drawings, in FIGS. 1-3 a drill guide apparatus designated generally by the reference numerals 10 includes a guide tube holder 12 including a tubular barrel portion 14 which may be of suitable strong material such as thick-walled tube steel, and three setscrews 16 which are of the type including hexagonal drive sockets. The setscrews 16 are arranged in a single plane and engaged in respective threaded bores 17 extending through the cylindrical wall 18 of the barrel 14 and directed radially inward toward the central axis 20 of the barrel 14. Extending away from the barrel 14, preferably also in the same plane with the setscrews 16 and also extending radially away from the central axis 20, is an arm 22, which may be of metal and which, preferably, is in the form of a cylindrical rod fixedly attached to the barrel 14. The arm 22 may have a length 24 of several inches, and may be secured to the barrel 14 by welding or by mating screw threads, for example.

A clamp tube 26 is, for example, a second length of thick-walled metal tubing of the same size as that of which the barrel 14 is made. A coaxial pair of holes 28 extend diametrically through the tube wall 30 on opposite sides of the clamp tube 26 and perpendicular to its central axis 32 at a location near a first end 34 of the clamp tube 26. The clamp tube 26 is disposed on the arm 22, which passes slidably and rotatably through the holes 28. A pair of setscrews 36 are engaged in threaded bores 37 extending diametrically toward one another through the wall 30 of the clamp tube 26 in the same plane as the holes 28 and perpendicular to the arm 22. The setscrews 36 are long enough to be tightened against the arm 22 to hold the clamp tube 26 securely in a desired position on the arm 22.

Located near a second end 38 of the clamp tube 26 are three clamping setscrews 40 engaged in threaded bores 42 extending through the wall 30 and directed radially inwardly in a single plane perpendicular to the central axis 32 of the clamp tube 26. Preferably, the clamping setscrews 40 are spaced apart equally about the clamp tube 26 so that the clamping setscrews 40 can be screwed inward to clamp the apparatus 10 to the head of a bolt or a nut such as the nut 44 threadedly engaged on the stud bolt 46 shown in FIG. 1, engaging three alternate faces of a hexagonal bolt head or nut. The second end 38 of the clamp tube 26 preferably rests flush against a flat surface 46 into which the threaded bore receiving the bolt 48 extends perpendicularly, as might commonly be the case. Where a surface such as the surface 46 is not available, however, the three setscrews 40 are sufficient to attach the clamp tube 26.

In the arrangement described above the central axis 20, depending upon the rotational position of the arm 22 within the holes 28, may be perpendicular to the surface 46 and thus parallel with the central axis 47 of the remaining portion 48 of a broken-off bolt engaged in a threaded bore 50. It will be appreciated that the barrel 14 of the guide tube holder 12 is shorter than the clamp tube 26, leaving an open space between the lower end 52 of the guide tube holder 12 and the surface 46.

A guide tube 54, slightly longer than the barrel 14, is cylindrical and has an outside diameter 56 which is barely less than the minimum inside diameter 58 of the bore 50. The guide tube 54 is preferably of hardened steel and includes a bore 60 extending coaxially and centrally through the guide tube 54. The bore 60 is of the appropriate diameter to receive and guide a drill 62 of the appropriate diameter, holding it snugly but freely rotatably, for boring a hole in the bolt 48 to receive a bolt extractor of the well-known type having a tapered, fluted, steeply-pitched spiral body with a twist opposite that of the threads of the bolt portion 48. Such an extractor is intended to engage itself within a bore drilled centrally through the remaining portion 48 of a bolt which has been broken off in the bore 50, to permit the remaining portion 48 to be unscrewed from the threaded bore 50. The guide tube 54 is held securely within the guide tube holder 12 by tightening the setscrews 16 against the exterior surface of the guide tube 54, securely holding the guide tube parallel with the central axis 20 of the guide tube holder 12.

The drilling guide apparatus 10 of the invention is used by fastening the clamp tube 26 as described previously to a conveniently located bolt, bolt head, or nut such as the nut 44 in a position of rotation about the central axis 32 in which the arm 22 extends toward the center of a broken-off bolt such as the remainder portion 48. The setscrews 36 and 40 are tightened to hold the clamp tube 26 and the arm 22 so that the bore 60 of a guide tube 54 of the appropriate size is centered above and aligned coaxially with the broken-off remainder 48 of a bolt. The required bore may then be drilled centrally using a drill 62 extending through the bore 60 and boring into the remainder 48 of a bolt broken off in the threaded hole 50, without damaging the threads of the threaded bore 50 or coming so close to those threads that the broken bolt extractor used would damage those threads while being used to unscrew the remaining portion 48 of the bolt from the threaded hole 50.

The use of the drill guide tube 54, held properly in position by the drill guide apparatus 10, makes it much easier than previously has been the case to drill a centrally located hole in a remaining portion 48 of a broken-off bolt.

Figure 4:
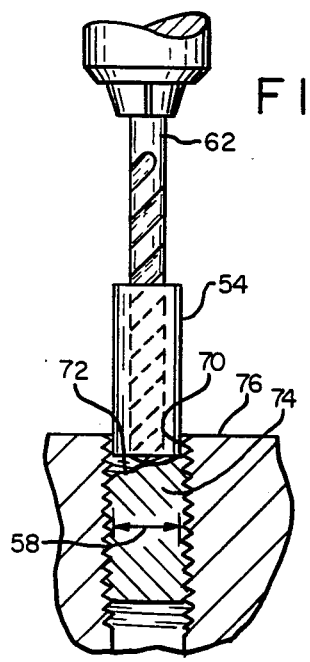
FIG. 4 is a side elevational view showing use of one of the drill guide tubes according to the invention to aid in drilling a centrally located hole in the remainder of a bolt broken off within a threaded bore.

Referring now also to FIG. 4, where a bolt has broken off within a threaded hole 70 with an uppermost surface 72 of a remaining portion 74 of the broken bolt located a sufficient distance beneath a surface 76 surrounding the threaded hole 70, an appropriate guide tube 54 may be employed to keep the drill 62 centrally located to provide the required bore for insertion of a bolt extractor, despite the upper surface 72 of the bolt piece 74 being so uneven that it would otherwise be impossible to hold the drill 62 properly located without a drill guide. For this reason, as mentioned previously, the outer diameter 56 of the guide tube 54 is chosen to be a snug sliding fit within the minimum inside diameter 58 of the threaded hole 70.

It will be appreciated that the guide tube 54 will be provided in several different sizes corresponding to the standard internal diameters of threaded holes of standard sizes.

Figure 5:
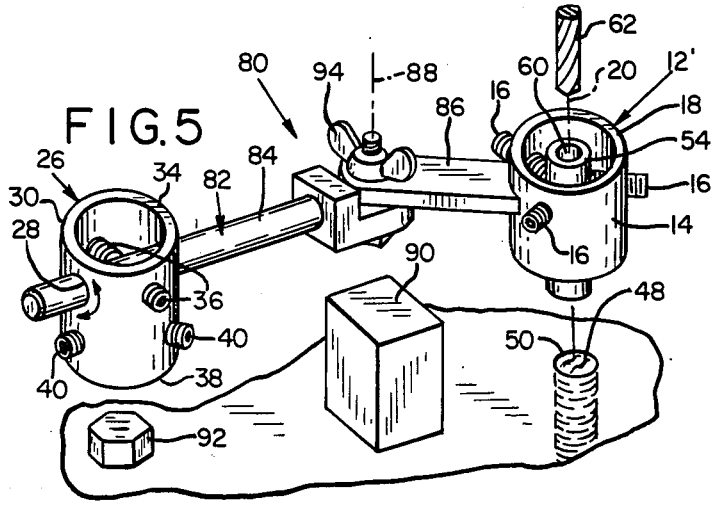
FIG. 5 is a perspective view of a drill guide holder which is an alternative embodiment of the apparatus of the present invention.

As shown in FIG. 5, an alternative embodiment 80 of the drilling guide apparatus of the invention includes an arm 82 having a cylindrical portion 84 pivotably connected to a second portion 86 which need not be cylindrical and which is fixedly attached to the guide tube holder barrel 14 of the guide tube holder 12'. A pivot axis 88 defined by the connection between the arm portions 84 and 86 is parallel with the central axis 20 of the guide tube holder 12' so that the apparatus 80 provides an additional degree of freedom of adjustment to accommodate different possible situations where there may not be a clear line available between a broken-off bolt and a nearby bolt 92, for example, because of a projection 90 located between the remainder 48 of a broken bolt and the nearest available bolt 92 to which the clamp tube 26 might be fastened. A bolt having a wingnut 94 permits the pivot joint to be fastened at a desired angle. The ability to pivot the second portion 86 of the arm 82 with respect to the first portion 84 also makes it possible for the setscrews 40 to be secured to the sides of a hexagonal head of a bolt 92 without having to loosen the bolt 92 in order to bring the guide tube 54 to a position centrally above the remaining portion 48 of a broken-off bolt.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. Guide apparatus for use in boring an axial hole centrally in a broken bolt to permit use of an extractor therein, comprising:

(a) a guide tube defining a bore of an appropriate size to guide a drill;
 (b) guide tube holder means for holding said guide tube securely in a predetermined location with respect to said guide tube holder means during use of said guide apparatus;
 (c) an arm fixedly attached to said guide tube holder means;
 (d) a clamp slidably disposed on said arm;
 (e) clamp fastening means for adjustably holding said clamp in a predetermined location on said arm; and
 (f) means included in said clamp for fixedly attaching said clamp to a protruding object located proximate said broken bolt and for holding said arm extending fixedly in a predetermined direction so as to support said guide tube with said bore thereof aligned coaxially with said broken bolt.

2. The guide apparatus of claim 1, including a plurality of interchangeable guide tubes having respective different exterior diameters and defining respective bores of different sizes.

3. The guide apparatus of claim 2 wherein each said guide tube has a cylindrical external surface of a size which fits slidingly within a threaded bore of a standard size and wherein the bore of said guide tube is located coaxial with said external surface and is of a size appropriate to guide a drill of a predetermined size for boring a hole to receive an extractor of the appropriate size for said broken bolt.

4. The guide apparatus of claim 1 wherein said arm includes an adjustably fastenable joint defining a pivot axis oriented parallel with the bore of a guide tube held in said guide tube holder means.

5. The guide apparatus of claim 1, said clamp including a clamp tube and a pair of setscrews threadedly engaged in said clamp tube and extending inwardly within said clamp tube into clamping abutment against said arm on opposite sides thereof.

6. The guide apparatus of claim 5 including a clamp tube wall and three setscrews located in threaded engagement with said clamp tube wall in a single plane perpendicular to said bore and arranged equidistant from one another, each said setscrew extending radially inwardly with respect to said clamp tube.

7. The guide apparatus of claim 1 wherein said guide tube holder means comprises a barrel having a cylindrical wall and a plurality of setscrews extending radially inwardly of said barrel in threaded engagement in respective threaded bores extending through said cylindrical wall.

8. The guide apparatus of claim 7 wherein said threaded bores extend radially through said cylindrical wall in a single plane.

9. The guide apparatus of claim 7 wherein said barrel has respective first and second ends and said arm and said threaded bores are located adjacent said first end thereof.

10. The guide apparatus of claim 7 wherein said guide tube is longer than said barrel.

11. The apparatus of claim 1 wherein said clamp includes a clamp tube having a clamp tube wall and a plurality of setscrews adjustably located in threaded engagement with said clamp tube wall and extending inwardly within said clamp tube in position to engage clampingly an object located within said clamp tube.

12. The guide apparatus of claim 1 wherein said clamp is selectively rotatable about said arm when said clamp fastening means is loosened and wherein said guide tube holder means defines a central axis which is perpendicular to said arm.

* * * * *